United States Patent [19]

Hwang et al.

[11] Patent Number: 5,444,893
[45] Date of Patent: Aug. 29, 1995

[54] APPARATUS FOR PREVENTING BUMPING AND FALLING OF AUTOMATIC TRAVELLING VACUUM CLEANER

[75] Inventors: Jin S. Hwang; Jang W. Lee, both of Busan, Rep. of Korea

[73] Assignee: Goldstar Co., Ltd., Seoul, Rep. of Korea

[21] Appl. No.: 117,626

[22] Filed: Sep. 8, 1993

[30] Foreign Application Priority Data

Sep. 8, 1992 [KR] Rep. of Korea ............ 16351/1992
Sep. 22, 1992 [KR] Rep. of Korea ............ 17275/1992

[51] Int. Cl.⁶ ........................................ A47L 11/10
[52] U.S. Cl. .................................... 15/319; 15/325; 15/340.3
[58] Field of Search ............... 15/319, 325, 340.1, 15/340.3, 354

[56] References Cited

U.S. PATENT DOCUMENTS

| | | | |
|---|---|---|---|
| 2,324,111 | 7/1943 | Ross | 15/325 |
| 3,952,361 | 4/1976 | Wilkins | 15/319 |
| 4,503,581 | 3/1985 | Early | 15/319 |
| 4,518,437 | 5/1985 | Sommer | 15/319 |
| 4,953,253 | 9/1990 | Fukuda | 15/319 |
| 5,086,535 | 2/1992 | Grossmeyer | 15/319 |

FOREIGN PATENT DOCUMENTS

| | | | |
|---|---|---|---|
| 4096717 | 3/1992 | Japan | 15/325 |
| 4096720 | 3/1992 | Japan | 15/325 |
| 23180 | of 1914 | United Kingdom | 15/340.1 |

Primary Examiner—David A. Scherbel
Assistant Examiner—Terrence R. Till

[57] ABSTRACT

An apparatus for and a method of preventing bumping and falling of an automatic travelling cleaner wherein a situation of the cleaner is determined by sensing a variation of flow rate of a fluid in an extension pipe depending on a gap between an intake port and a surface to be cleaned, thereby deriving a suction work ratio or sensing revolutions and a current value of a cleaning motor or a torque value of each travel motor, and then determining a travel, a bumping, and a step sensing, based on the sensed value. The present invention eliminates the provision of a plurality of sensors densely arranged around a cleaner and adapted to sense bumping and falling of the cleaner and thus eliminates the requirement of additional devices for the sensors. This reduces the manufacture costs.

8 Claims, 17 Drawing Sheets

ROTATION SPEED

| CONDITION | TORQUE APPLIED TO MOTOR | REVOLUTION OF CLEANING MOTOR | CURRENT IN CLEANING MOTOR |
|---|---|---|---|
| | HIGH (POINT) | SLOW (POINT) | LARGE (POINT) |
| | MIDDLE (POINT) | MIDDLE (POINT) | MIDDLE (POINT) |
| | LOW (POINT) | FAST (POINT) | SMALL (POINT) |

APPARATUS FOR PREVENTING BUMPING AND FALLING OF AUTOMATIC TRAVELLING VACUUM CLEANER

BACKGROUND OF THE INVENTION

1. Field of the Invention

The present invention relates to an apparatus for and a method of preventing bumping and falling of an automatic travelling vacuum cleaner.

2. Description of the Prior Art

FIGS. 1A to 1C are a plan view, a rear view, and a right side view of a general automatic travelling vacuum cleaner, respectively. As shown in FIGS. 1A to 1C, the cleaner comprises a cleaner body 30, and a pair of wheels, namely, a left wheel 41 and a right wheel 42 rotatably mounted to left and right rear ends of the cleaner body 30, respectively. A caster 40 is disposed at the center of the front portion of cleaner body 30. The left wheel 41 is coupled to a left wheel drive motor 13 via a speed reduction device 45 including reduction gears. In similar, the right wheel 42 is coupled to a right wheel drive motor 14 via a speed reduction device 46 including reduction gears. With these constructions, the left and right wheels 41 and 42 are driven by drive motors 13 and 14, individually. Between the drive motors 13 and 14, a pair of sensors 1 are disposed for sensing the revolutions of wheels 41 and 42, respectively. To the lower portion of cleaner body 30, a bumper 31 is attached, which surrounds the cleaner body lower portion. The bumper 31 is made of a soft rubber material, for preventing an impact from being applied to the cleaner body 30. Attached to the front portion of the bumper 31 are a pair of position discriminators each including a receiver and a transmitter, for discriminating the condition of an area in front of the cleaner. At the cleaner body 30, a dust suction intake port 51 is provided in front of the caster 40. In front of the drive motors 13 and 14, battery cases 48 and 49 are disposed, which contain batteries to be used as power sources for the drive motors 13 and 14. Above the battery cases 48 and 49, a control device 53 which has an arrangement illustrated in FIG. 2 is disposed. The cleaner body 30 also includes at its front portion a cleaning motor 50 and a dust collecting chamber 52. The cleaning motor 50 drives when a cleaning is carried out.

FIG. 2 is a block diagram of the control device 53 shown in FIG. 1.

As shown in FIG. 2, the control device 53 includes a distance sensor 1 for outputting a pulse signal proportional to the revolutions of the left and right wheels 41 and 42 and a direction sensor 2 which is, for example, a gyro for detecting a change of the travel direction of the cleaner. A position discriminating unit 3 is also provided which is adapted to scan an output signal from the direction sensor 2 so as to determine the travel direction and the travelled distance of the cleaner. The position discriminating unit 3 further operates and derives momentarily the current position of the cleaner on a two dimensional coordinate, for every predetermined travelled distance. The control device 53 further includes an object sensor 4 disposed at the front surface of the cleaner and adapted to emit an ultrasonic wave so as to determine the presence of an object or a wall and a touch sensor 5 disposed at the front surface of the cleaner and adapted to sense the bumping of the cleaner. An amplifying circuit 7 is also provided for amplifying output signals from the object sensor 4 and the touch sensor 5 to an appropriate level. The control device 53 further includes a drive circuit 12 for reversibly controlling the rotations of drive motors 13 and 14 and controlling the rotation of the cleaning motor 50 attached to the cleaner, remote-control receiver and transmitter 16 and 17 for interrupting a travel command in preference to the drive circuit 12 so as to train the cleaner to the boundary of a moving zone and optionally adjusting the interrupt, manipulating units 16A and 16B for performing ON/OFF of a power source for the cleaner, the switching of a travel mode, the setting of a start position, and the adjustment of the sensitivity of the direction sensor 2, and a control unit 6 for outputting at the drive circuit 12 according to a signal received from the position discriminating unit 3, the amplifying circuit 7, the remote-control receiver circuit 16, or the manipulating unit 16A.

The operation of the conventional cleaner having the above-mentioned construction will now be described in conjunction with FIG. 3.

When a 90° left turn signal or a 90° right turn signal from a remote-control transmitter 17 is received in the remote-control receiver 16 when the cleaner travels straight, the cleaner turns 90° left or light at a first step S1. At this time, data about the straight travelled distance before the turning and the cleaner direction after the turning is stored. At a second step S2, absolute coordinates for cleaning blocks are derived, based on the data about the straight travelled distance and the cleaner direction. At a third step S3, a rectangular cleaning zone is derived, which is constituted by contiguous cleaning blocks derived at the second step S2. Finally, a cleaning is carried out while the cleaner moves in a zig-zag manner along the rectangular cleaning zone according to a predetermined order, namely, from a cleaning start block to a cleaning end block, at a fourth step S4.

The cleaning motor 50 is kept in a driving state for a period from the first step S1 to the fourth step S4. When the cleaning is completed at the cleaning end block, the cleaning motor 50 is turned off so that the cleaner returns to its initial state, i.e., its travel start state.

In the conventional automatic travelling cleaner, however, the reliability of sensing a bumping of the cleaner against an object is ensured only when a plurality of sensors for sensing the bumping are densely arranged around the cleaner. The provision of many sensors requires additional devices which results in an increase in manufacture cost.

SUMMARY OF THE INVENTION

Therefore, an object of the present invention is to solve the above-mentioned problems encountered in the prior art and thus to provide an apparatus for and a method of preventing bumping and falling of an automatic travelling cleaner by sensing a variation in a flow rate of a fluid in an extension pipe depending on a gap between an intake port and a surface to be cleaned, thereby deriving a suction work ratio, and determining a travel, a bumping, and a step sensing, based on the derived suction work ratio.

Another object of the present invention is to provide an apparatus for and a method of preventing bumping and falling of an automatic travelling cleaner by sensing revolutions and a current value of a cleaning motor or a torque value of each travel motor, and determining a travel, a bumping, and a step sensing, based on the sensed value.

In accordance with one aspect, the present invention provides an apparatus for preventing bumping and falling of an automatic travelling cleaner, comprising: an extension pipe connected to a dust collecting chamber provided in an interior of a cleaner body of said cleaner; an intake member slidably fitted in said extension pipe; a packing fitted in one end of the extension pipe and adapted to prevent a fluid from leaking through said end of the extension pipe; an ultrasonic wave emitting element disposed between the extension pipe and the dust collecting chamber and adapted to emit an ultrasonic wave according to a flow rate of a fluid being sucked; a pair of ultrasonic wave receiving elements disposed between the extension pipe and the dust collecting chamber and adapted to receive said ultrasonic wave from said ultrasonic wave emitting element; fluid flow rate sensing/suction work ratio calculating means adapted to receive ultrasonic waves from said ultrasonic wave receiving elements, sense a variation in the flow rate of said fluid being sucked, and calculate a suction work ratio, based on said received ultrasonic waves; a bumper hole provided at a predetermined position of a bumper of the cleaner; a contact protrusion member extending through said bumper hole, said contact protrusion member being adapted to support said intake member and disposed to reciprocate forward and backward; and a spring adapted to resiliently connect the contact protrusion member with said bumper.

As a cleaning zone recognition is initiated after the cleaner starts to clean a surface to be cleaned, a flow rate of a fluid passing through the extension pipe is measured by use of the ultrasonic wave emitting element and the ultrasonic wave receiving elements attached to the extension pipe so that the quantity of the fluid and the suction work ratio are calculated. When the calculated suction work ratio is a value which corresponds to a state that neither of bumping or falling has not been sensed, the cleaner continues to travel. However, when the calculated suction work ratio is a value which corresponds to a state that a step has been sensed, the turning radius of the cleaner is calculated so as to determine whether the cleaner is turnable. Where the cleaner is unable to turn, the cleaner moves backward slightly. At a turnable position, the cleaner recognizes coordinate values of the position and then turns 90° left.

When the suction work ratio calculated by measuring the fluid flow rate in the extension pipe is a value which corresponds to a state that a bumping has been sensed, a determination is made about whether the cleaner is turnable. Where the cleaner is unable to turn, the cleaner moves backward slightly. At a turnable position, the cleaner recognizes coordinate values of the position and then turns 90° left. After completing the 90° left turn, the cleaner continues to travel until the cleaning zone recognition is completed. After the completion of the cleaning zone recognition, the cleaner performs a cleaning in a zig-zag manner for all of predetermined partitioned cleaning zones.

In accordance with another aspect of the present invention, revolutions of a cleaning motor are calculated so as to determine a travel state, a bumped state, and a step-sensed state of the cleaner. This case utilizes a variation in revolutions of the cleaning motor depending on a variation in a gap between an intake port of the cleaner and the surface to be cleaned. In this regard, the present invention provides an apparatus for preventing bumping and falling of an automatic travelling cleaner, comprising: a revolution detector adapted to output a signal indicative of the number of revolutions of the cleaning motor; a motor revolution measuring unit adapted to scan the signal from the revolution detector and thus measure the number of revolutions of the cleaning motor; and a state discriminating unit adapted to receive an output signal from the motor revolution measuring unit and thus discriminate the state, i.e., the situation of the cleaner. The present invention further provides a method for preventing bumping and falling of an automatic travelling cleaner, comprising the steps of: measuring the number of revolutions of a cleaning motor varied depending on a variation in a gap between an intake port of said cleaner and surface to be cleaned; regarding the current state of the cleaner as a travel state when said measured motor revolutions corresponds to a predetermined low rotation speed, and making the cleaner travel continuously; regarding the current state of the cleaner as a step-sensed state when said measured motor revolutions correspond to a predetermined high rotation speed, and determining whether the cleaner is turnable; and regarding the current state of the cleaner as a bumped state when said measured motor revolutions correspond to a predetermined middle rotation speed, and determining whether the cleaner is turnable, whereby the cleaner is prevented from being bumped and falling.

In accordance with another aspect of the present invention, a current amount flowing in the cleaning motor is calculated so as to determine a travel state, a bumped state, and a step-sensed state of the cleaner. This case utilizes a variation in the current amount of the cleaning motor depending on a variation in the gap between the intake port of the cleaner and the surface to be cleaned. The current amount flowing in the cleaning motor is sensed by current measuring means such as a hall element.

A bumping of the cleaner against an object may also be sensed from a variation in a torque applied to a travel motor of the cleaner. To this end, the present invention provides an apparatus for preventing bumping and falling of an automatic travelling cleaner, comprising: an encoder sensor adapted to detect rotation speeds of a travel motor, distance sensors arranged around the cleaner and adapted to sense the distance between the cleaner and an object, a control circuit adapted to receive a distance sensing signal from the distance sensor and thus control the rotation of the motor, an encoder circuit adapted to receive a travel motor rotation speed signal detected by said encoder sensor and output it in the form of a digital signal, a distance sensor circuit adapted to receive a distance information signal sensed by said distance sensor and output it in the form of a digital signal, and a microcomputer stored with a reference torque value data and adapted to calculate a loaded torque value from a current value flowing in the travel motor, a voltage applied to the travel motor, a rate of a voltage applied to the travel motor, i.e., a PWM value, or a rotation speed value of the travel motor and to compare said calculated torque value with said reference torque value.

When the calculated torque is not lower than the reference torque, the cleaner is determined as having been bumped against an object. At this state, the cleaner moves backward slightly and then turns left or right to bypass the object. On the other hand, the state that the calculated torque is lower than the reference torque is determined as a state that no bumping has occurred.

The present invention eliminates the provision of a plurality of sensors densely arranged around a cleaner and adapted to sense bumping and falling of the cleaner and thus eliminates the requirement of additional devices for the sensors, thereby reducing the manufacture costs.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1A:
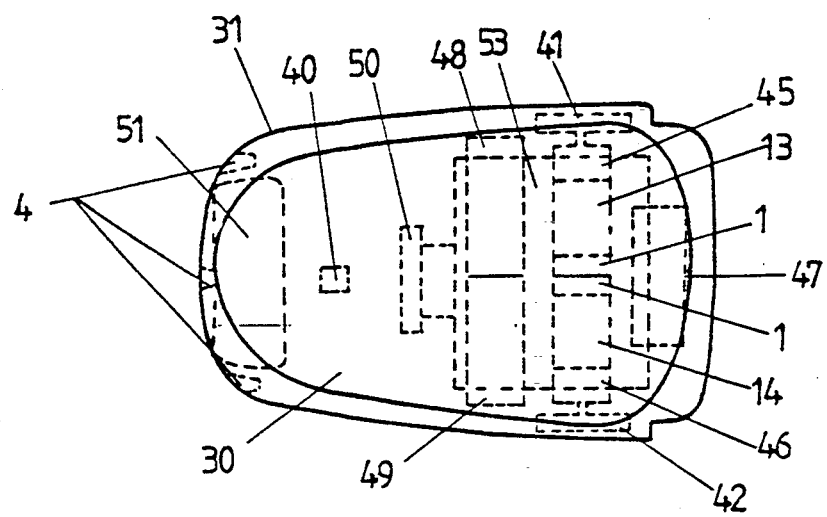
FIGS. 1A to 1C are a plan view, a rear view, and a right side view of a conventional automatic travelling vacuum cleaner, respectively.
Figure 1B:
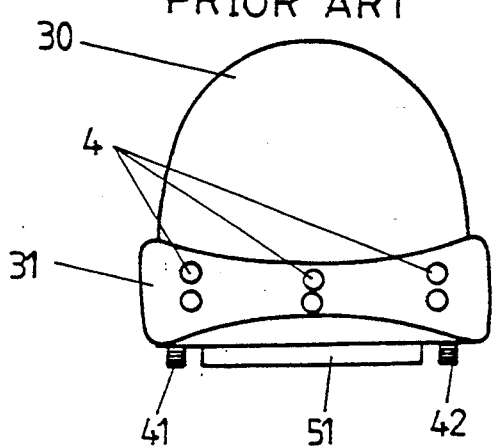
Figure 1C:
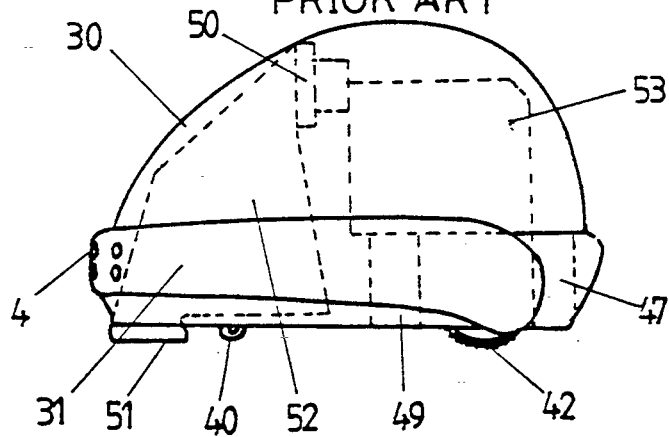
Figure 2:
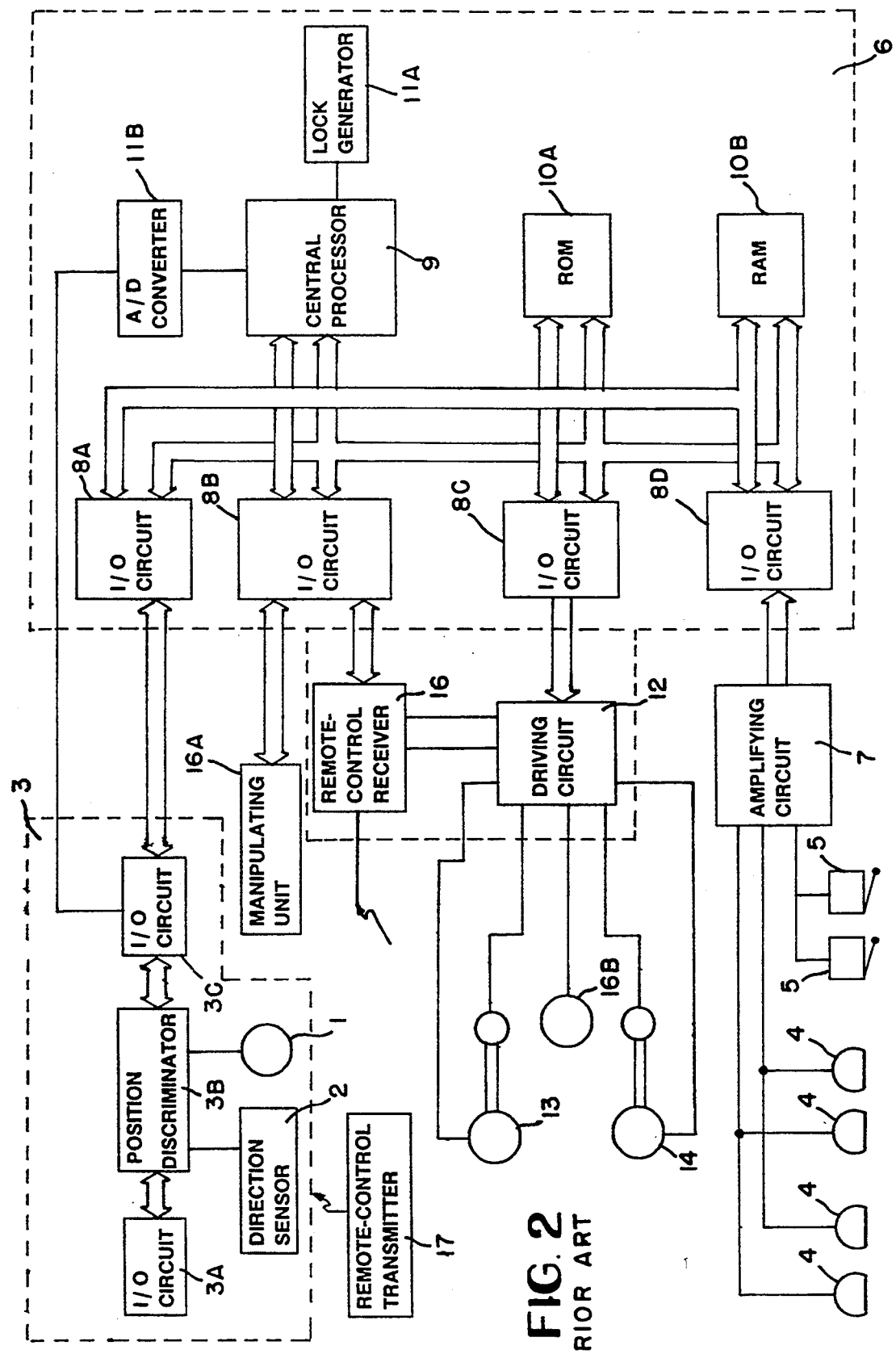
FIG. 2 is a block diagram of a control device employed in the conventional automatic travelling vacuum cleaner.
Figure 3:
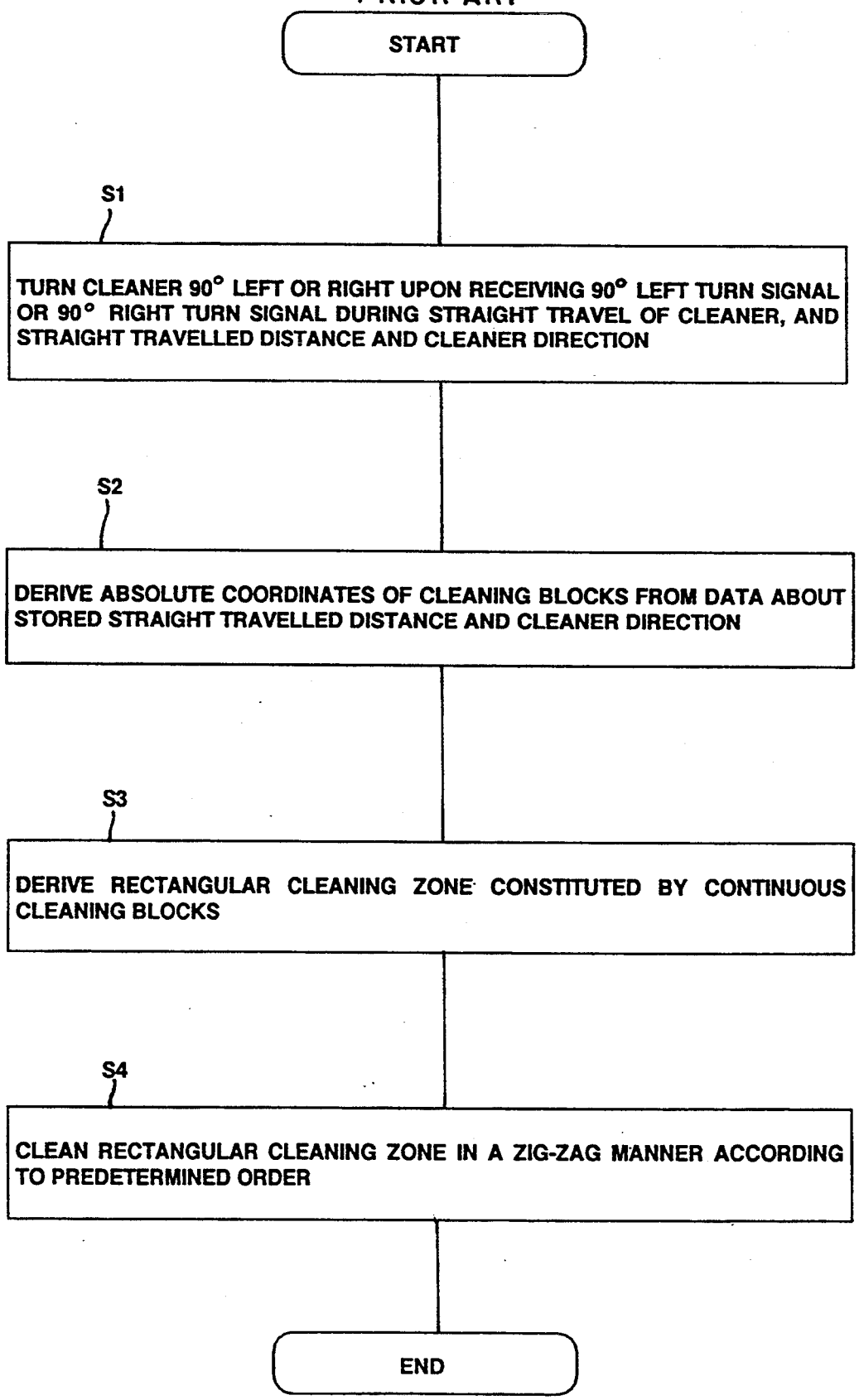
FIG. 3 is a flow chart illustrating a control operation of the conventional automatic travelling vacuum cleaner.
Figure 4:
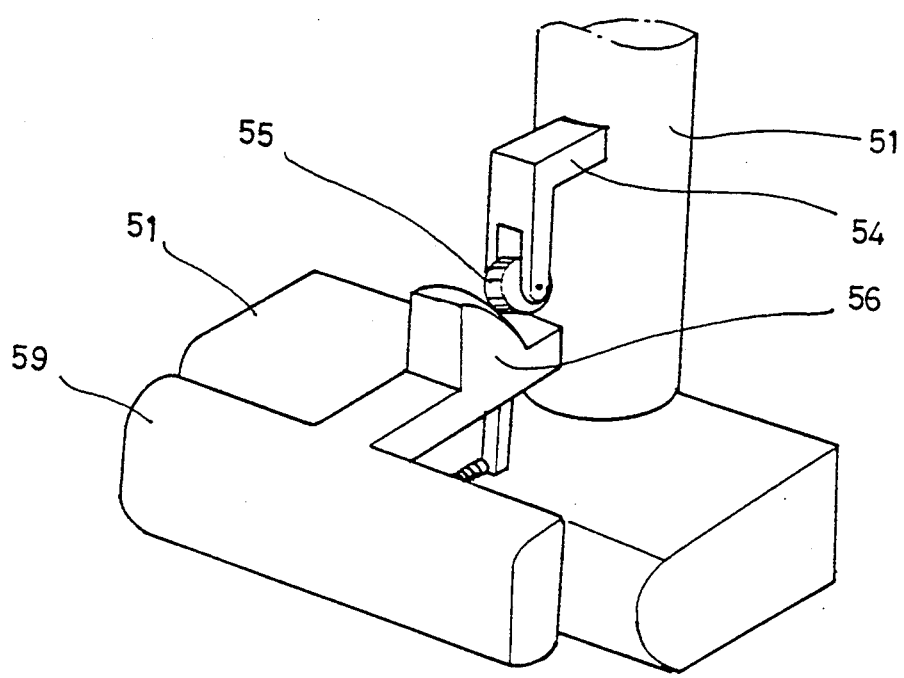
FIG. 4 is a perspective view of an apparatus for preventing bumping and falling of an automatic travelling vacuum cleaner in accordance with an embodiment of the present invention.
Figure 6:
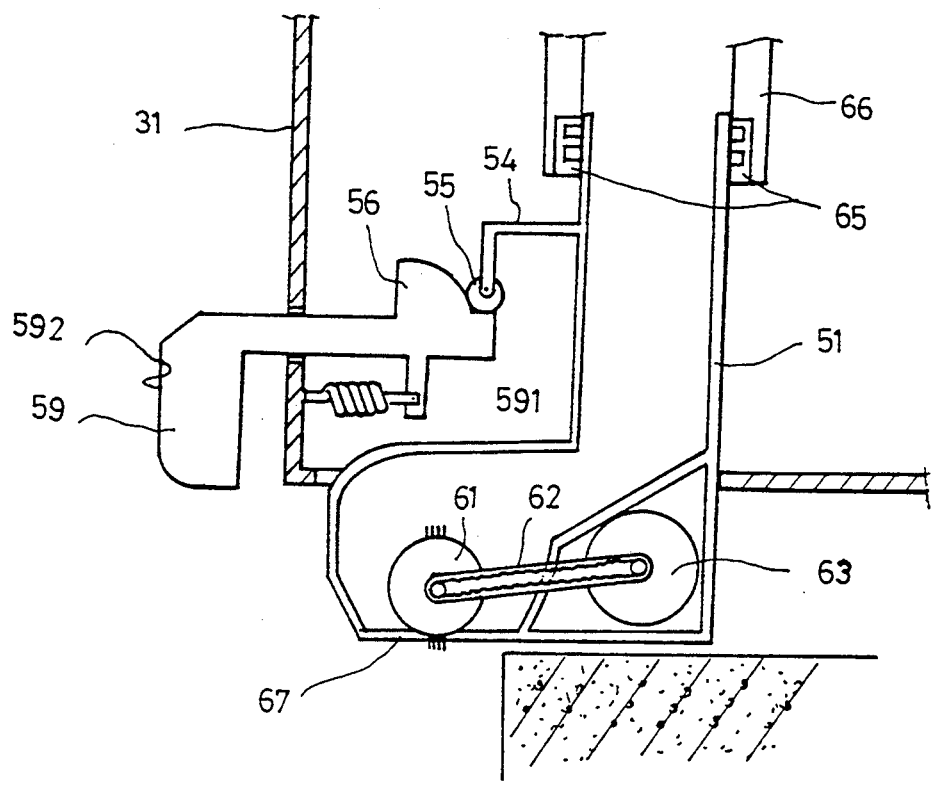
FIG. 6 is a sectional view of the apparatus shown in FIG. 4, illustrating a step-sensed state.
Figure 7:
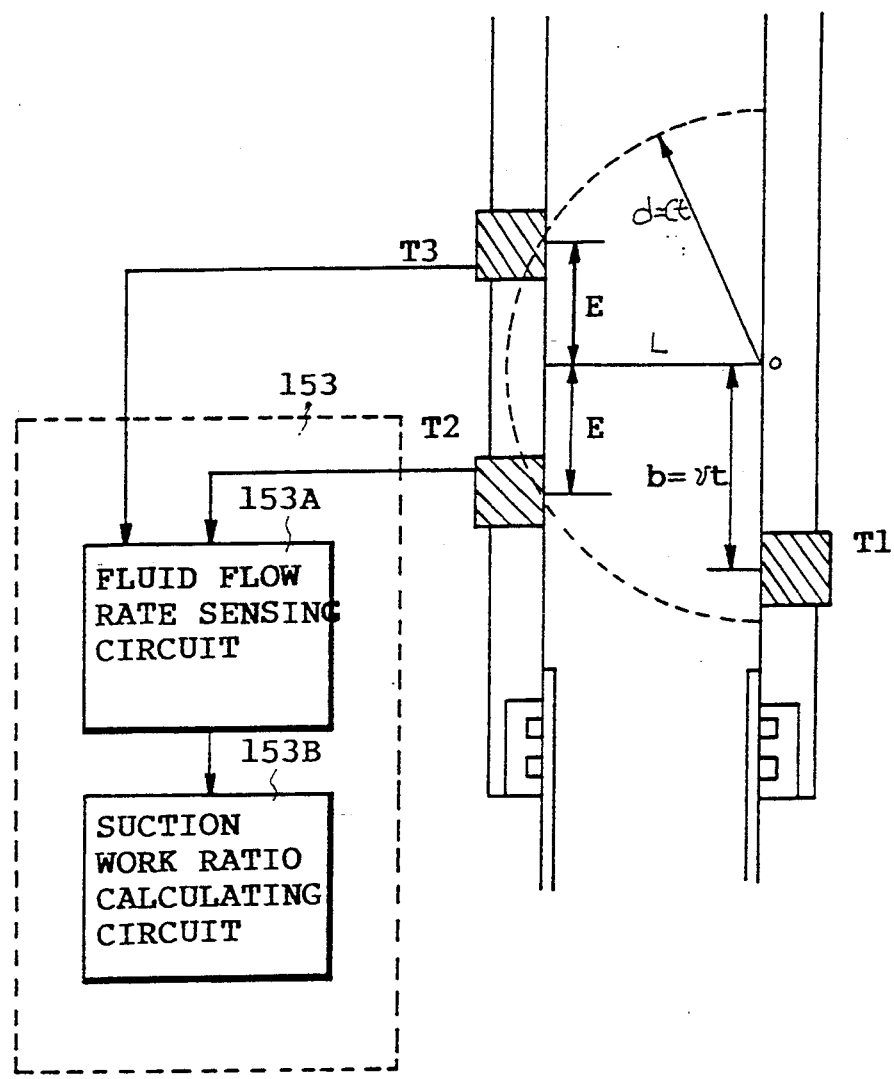
FIG. 7 is a schematic view of a fluid flow rate sensing device employed in the apparatus of FIG. 4 in accordance with the present invention.

FIG. 4 is a perspective view of an apparatus for preventing bumping and falling of an automatic travelling cleaner in accordance with an embodiment of the present invention. FIG. 6 is a sectional view illustrating the interior of the apparatus shown in FIG. 4. FIG. 7 is a schematic view of a fluid flow rate sensing device employed in the apparatus in accordance with the present invention. As shown in the figures, the apparatus comprises an extension pipe 66 connected to a dust collecting chamber 52 provided in the interior of a cleaner body 30 and an intake member 51 slidably fitted in the extension pipe 66. A packing 65 is fitted in one end of the extension pipe 66, for preventing a leakage of fluid through the end of extension pipe 66. Disposed between the extension pipe 66 and the dust collecting chamber 52 are an ultrasonic wave emitting element T1 for emitting an ultrasonic wave according to a flow rate of a fluid being sucked and a pair of ultrasonic wave receiving elements T2 and T3 for receiving the ultrasonic wave from the ultrasonic wave emitting element T1. The apparatus further comprises a fluid flow rate sensing/suction work ratio calculating unit 153 (FIG. 7) which receives ultrasonic waves from the ultrasonic wave receiving elements T2 and T3, senses a variation in flow rate of the fluid being sucked and calculates a suction work ratio, based on the received ultrasonic waves. A bumper hole 58 is provided at a proper position of the bumper 31. A contact protrusion member 59 extends through the bumper hole 58. The contact protrusion member 59 is adapted to support the intake member 51 and disposed to reciprocate forward and backward. A spring 60 is mounted between the bumper 31 and the contact protrusion member 59 so as to resiliently connect them with each other.

In the intake member 51, a rotating brush 61 and a brush driving motor 63 are disposed. The rotating brush 61 is coupled to the brush driving motor 63 via a timing belt 62. The intake member 51 has an intake port 67 disposed adjacent to the lower end of the rotating brush 61. The intake member 51 also has an inclined surface at its front lower end portion so that the cleaner is easily lifted when it is bumped against a protrusion or a doorsill. A bracket 54 is attached to a proper position on the outer front surface of the intake member 51 and provided with a roller 55.

The contact protrusion member 59 has at its rear end portion a sector protrusion 56 kept in contact with the roller 55 of the bracket 54 and a protrusion 591 supporting one end of the spring 60. The contact protrusion member 59 also has at its front end portion a contact portion 592 protruded outwardly of the cleaner body 30.

As shown in FIG. 7, the fluid flow rate sensing/suction work ratio calculating unit 153 comprises a fluid flow rate sensing circuit 153A for receiving ultrasonic waves from the ultrasonic wave receiving elements T2 and T3 and sensing a flow rate of the fluid being sucked, based on the received ultrasonic waves, and a suction work ratio calculating circuit 153B for receiving a signal from the fluid flow rate sensing circuit 153A and calculating a fluid quantity from a fluid quantity equation of Cross-sectional Area*Fluid Flow Rate and a suction work ratio from a suction work ratio equation of Constant*Fluid Quantity*Vacuum Level.

Operation of the apparatus with the above-mentioned construction will now be described, in conjunction with FIG. 6 and FIGS. 8A to 12.

As the gap between the rectangular intake port 67 formed at the bottom portion of the intake member 51 and a surface 64 to be cleaned becomes narrower, the flow rate of a fluid passing through the extension pipe 66 is gradually lowered. This results in a decrease in the flow rate of fluid passing through the cleaning motor 50 and a decrease in the revolutions of cleaning motor 50. On the other hand, the fluid flow rate in the extension pipe 66 becomes higher at a wider gap between the intake port 67 and the surface 64 to be cleaned. When the intake port 67 does not have a uniform gap throughout its length, but has a wider gap at its one end, the fluid flow rate in the extension pipe 66 is increased. At this time, the revolutions of the cleaning motor 50 are also increased. Such operations will be described.

Figure 8A:
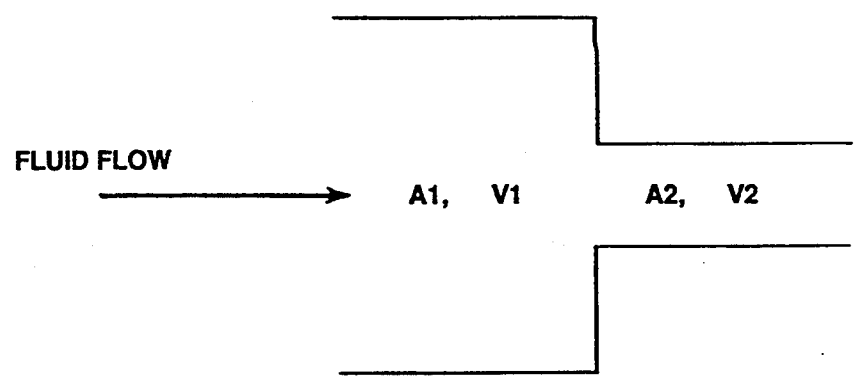
FIGS. 8A and 8B are schematic views explaining a detection of a fluid flow rate in the apparatus of FIG. 4 in accordance with the present invention.

In a case illustrated in FIG. 8A, the quantity Q of a fluid flowing in the extension 66 is expressed by the following equation (1):

$$Q = A1 * V1 = A2 * V2 \tag{1}$$

From the equation (1), V2 can be expressed by the equation of $V2 = (A1/A2) * V1$. From this equation, it is known that V2 is higher than V1 because the cross-sectional area A1 is larger than the cross-sectional area A2.

Figure 8B:
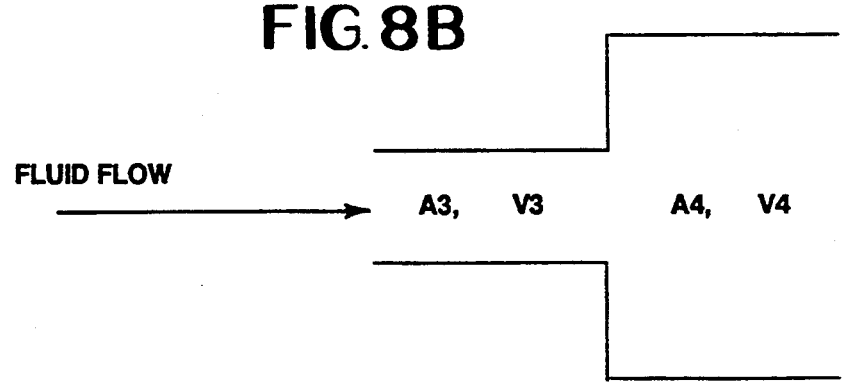
Figure 9:
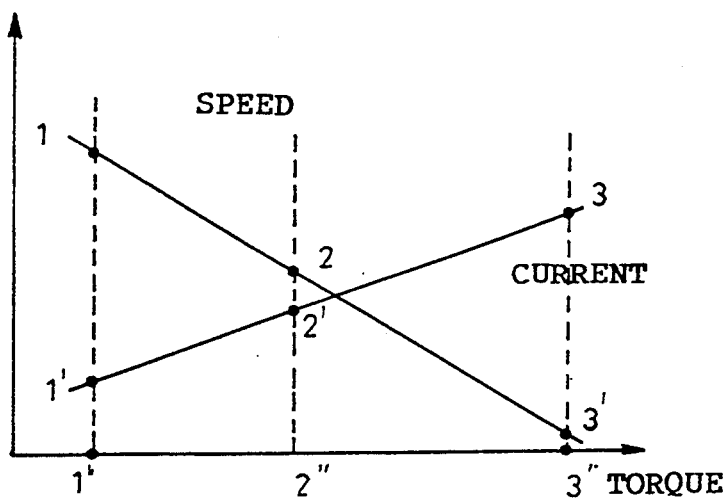
FIGS. 9A and 9B are a graph illustrating a relation between revolutions of a cleaning motor and a current flowing in the cleaning motor and a diagram illustrating variations in torque, motor revolutions, current depending on a variation in a gap between an intake port and a surface to be cleaned, respectively.

In a case illustrated in FIG. 8B, the quantity Q of a fluid flowing in the extension 66 is expressed by the following equation (2):

$$Q = A3 * V3 = A4 * V4 \tag{2}$$

From the equation (2), V4 can be expressed by the equation of $V4 = (A3/A4) * V3$. From this equation, it is known that V4 is lower than V3 because the cross-sectional area A3 is smaller than the cross-sectional area A4.

By analogizing the relation between the intake port 67 and the surface 64 to be cleaned, based on the above equations (1) and (2), it can be found that at a wide gap between the intake port 67 and the surface 64 to be cleaned, namely, in a case that a step is sensed, the fluid flow rate in the extension pipe 66 is increased according to the equation (1). On the other hand, when the gap between the intake port 67 and the surface 64 to be cleaned is narrow, the fluid flow rate in the extension pipe 66 is decreased according to the equation (2). According to such a principle, the suction work ratio can be derived from a sensed fluid flow rate in the extension pipe 66. At this time, the quantity of the fluid is derived by multiplying the fluid flow rate by the cross-sectional area through which the fluid passes. Since the extension pipe 66 has a diameter L, as shown in FIG. 7, the cross-sectional area is $\pi L^2/4$. The cross-sectional area is constant because the extension pipe 66 has a constant diameter throughout its length. Accordingly, the fluid quantity is proportional to the fluid flow rate. Where the fluid does not flow to have a flow rate of 0 and the ultrasonic wave emitting element T1 is disposed at an intermediate position between the ultrasonic wave receiving elements T2 and T3, an ultrasonic wave emitted from the element T1 reaches both the elements T2 and T3 at the same phase and intensity. Assuming that the time taken in transmitting the ultrasonic wave and the velocity of sound are t and c, respectively, the ultrasonic wave transmitting distance d is c*t. In a case where the fluid flows at a rate of V and thereby carries the ultrasonic wave at the same rate, the elements T2 and T3 can receive the ultrasonic wave from the element T1 at the same phase and intensity, by shifting the element T1 from the intermediate position between the elements T2 and T3 by a distance b (b=V*t) upstream of the extension pipe 66. In this case, the condition of $b/c = b/d = b/\sqrt{L^2 + E^2}$ is established where E is the axial distance of the intake pipe. Accordingly, the fluid quantity (cross-sectional area*fluid flow rate) can be expressed by the equation: $Q = \pi L^2 / 4 * b / \sqrt{L^2 + E^2}$.

In accordance with the KS standard, a suction work ratio can be derived from an equation expressed by Constant*Fluid Quantity*Vacuum Level. The vacuum level can be found by use of a test device for deriving a suction work ratio. Since the obtained vacuum level can be handled as a constant, the following condition is established: Suction Work Ratio=Constant*Fluid Quantity*Vacuum Level=Constant*Fluid Quantity=-Constant*Cross-sectional Area*Fluid Flow Rate=-Constant*Fluid Flow Rate. Accordingly, it is understood that the suction work ratio has a relation with the flow rate of a fluid passing through the extension pipe 66. Thus the suction work ratio can be derived only by obtaining the fluid flow rate.

Figure 5A:
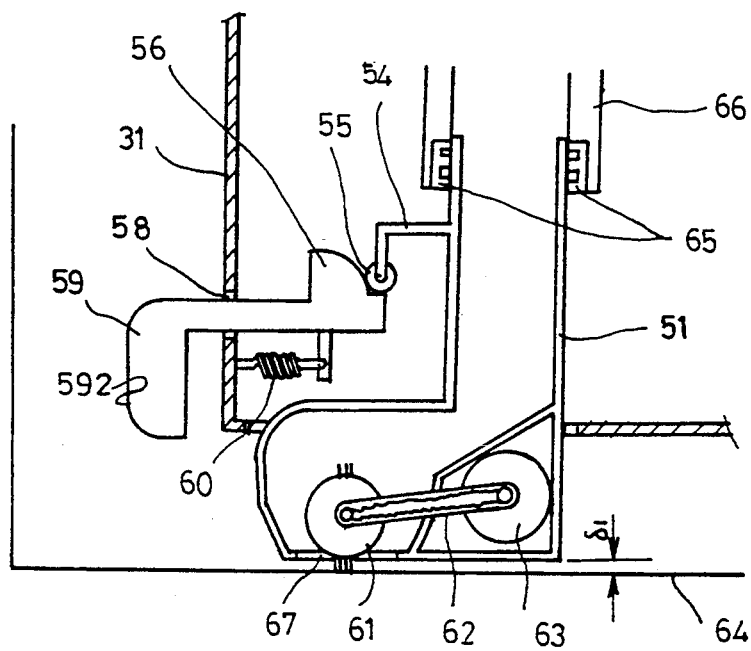
FIGS. 5A and 5B are sectional views of the apparatus shown in FIG. 4, illustrating a state that no bumping occurs and a bumped state, respectively.
Figure 5B:
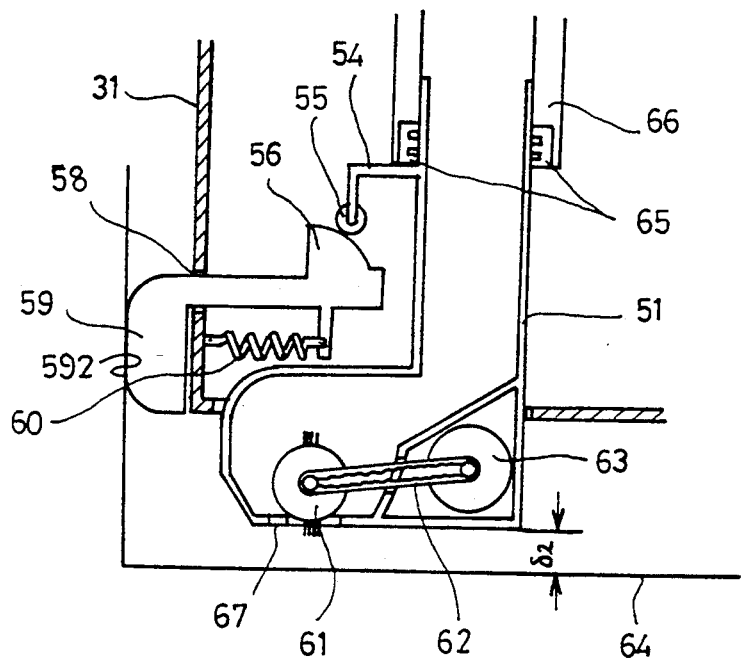
Figure 10:
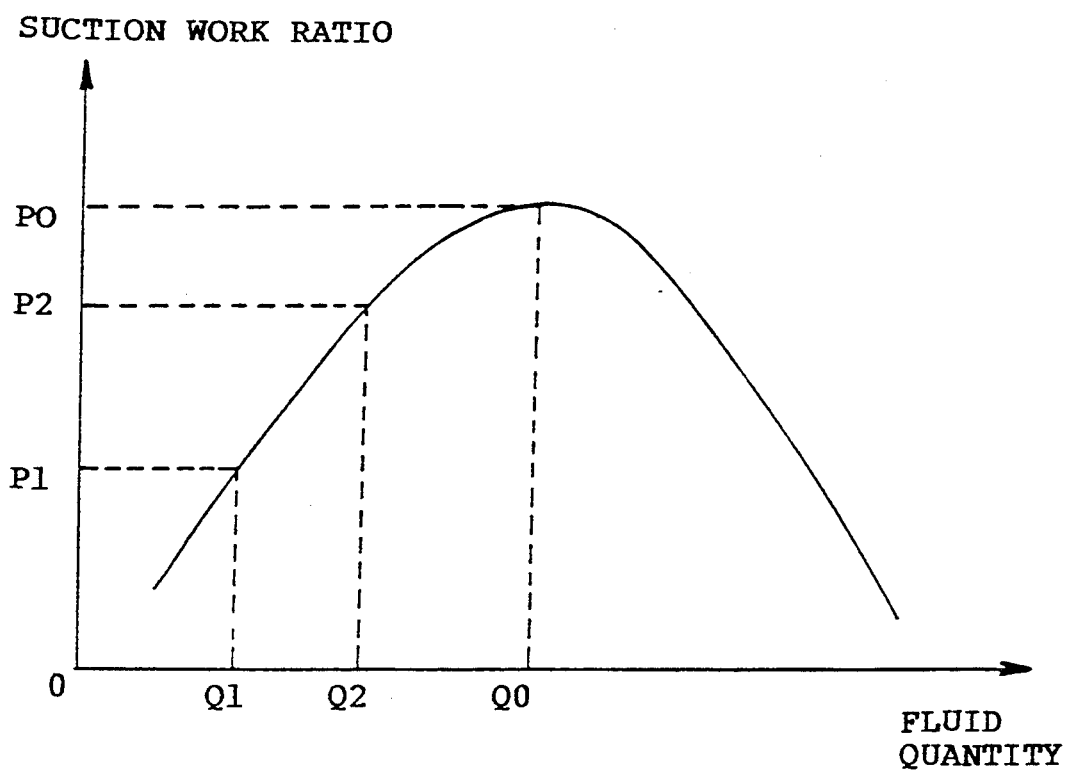
FIG. 10 is a graph illustrating a relation between a suction work ratio and a fluid quantity.
Figure 11:
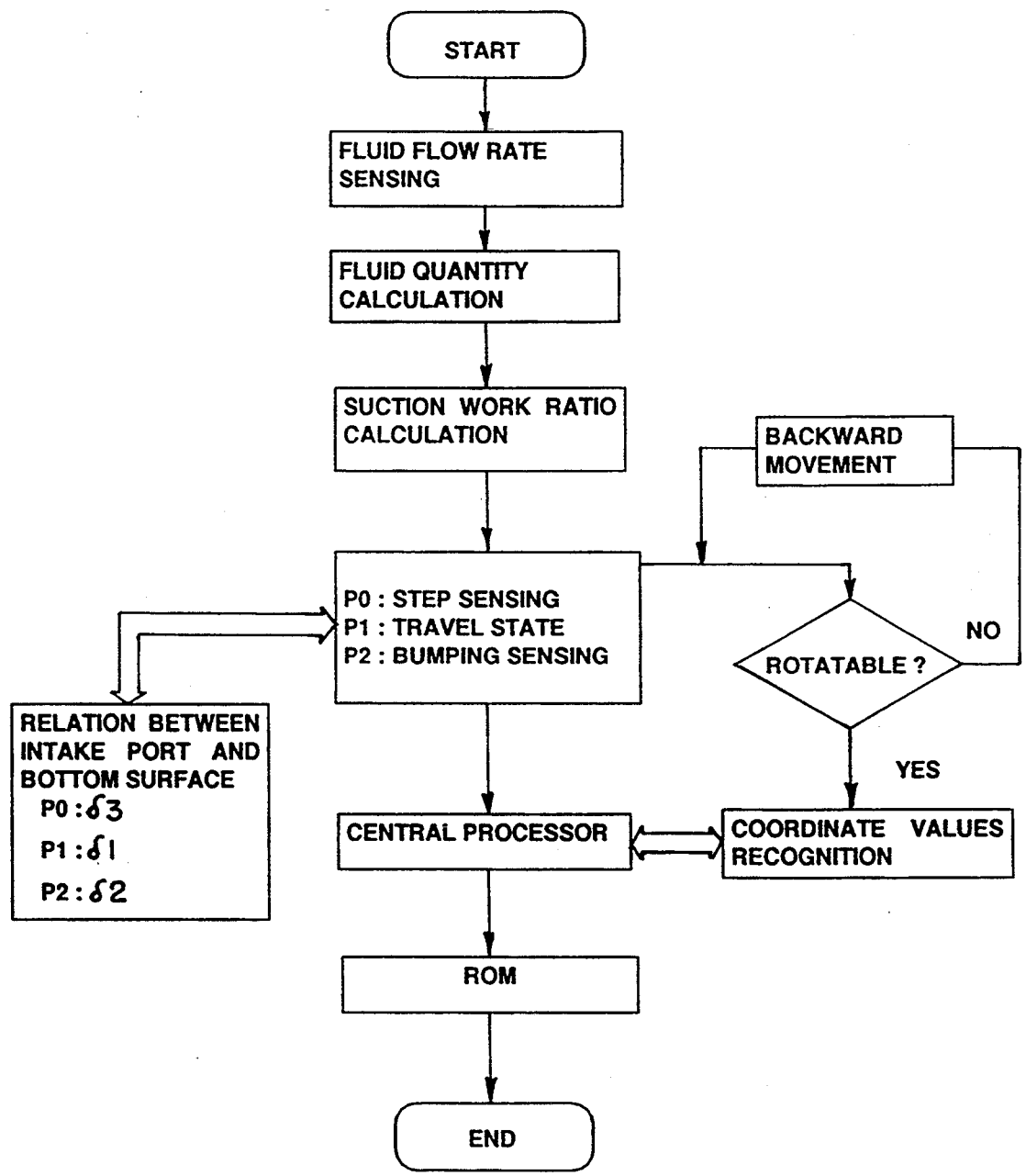
FIG. 11 is a flow chart illustrating a calculation of the suction work ratio in accordance with the present invention.

FIG. 10 illustrates a relation between the suction work ratio P and the fluid quantity Q. As shown in FIG. 10, the suction work ratio P is increased, when the fluid quantity Q becomes larger. Such an increase in suction work ratio P is continued until the fluid quantity Q reaches its maximum value Q0. Thereafter, the suction work ratio P is gradually decreased. In accordance with the present invention, a flow rate of a fluid passing through the extension pipe 66 is derived by use of a test device for a cleaner vacuum level. The derived fluid flow rate is used as a reference value. This reference fluid flow rate is then compared with a fluid flow rate in the extension pipe 66 measured during a cleaning. When the reference fluid flow rate is lower than the measured fluid flow rate, it is regarded that a foreign matter has been caught in the intake port 51 or the extension pipe 66. In this case, an appreciate signal is supplied to the control unit 6 which, in turn, recognizes the signal and informs the user of the generated state, via a buzzer.

Where the measurement of the suction work ratio P is limited to a value PO corresponding to the maximum value QO of the fluid quantity, the suction work ratio P is proportional to the fluid quantity Q. Since the fluid quantity Q is proportional to the fluid flow rate V, the suction work ratio P is proportional to the fluid flow rate V. Accordingly, it is possible to prevent a bumping and a falling of the cleaner by sensing the suction work ratio P. Such an operation will now be described in detail, in conjunction with FIGS. 5A and 6.

When the cleaner is bumped against a wall or an object during its travel, the contact protrusion member 59 is pushed backward, so that the roller 55 mounted to the bracket 54 moves along the sector protrusion 56, thereby causing the intake member 51 to be lifted away from the surface 64 to be cleaned. As a result, the fluid flow rate in the extension pipe 66 is increased. At this time, the fluid quantity corresponds to a value Q2 of FIG. 10. As the cleaner then moves backward, the contact protrusion member 59 returns to its original position defined prior to the bumping, by virtue of the spring force of the spring 60. Where the cleaner meets a step during its travel, as shown in FIG. 6, the fluid flow rate is more increased, as compared to the case that a bumping of the cleaner occurs. At this time, the fluid quantity corresponds to the maximum value Q0. As shown in FIG. 10, the suction work ratio is P2 at the fluid quantity Q2 when the step is sensed and P0 at the fluid quantity Q0 when the bumping occurs.

Now, operation of the cleaner will be described, in conjunction with FIG. 12.

Figure 12:
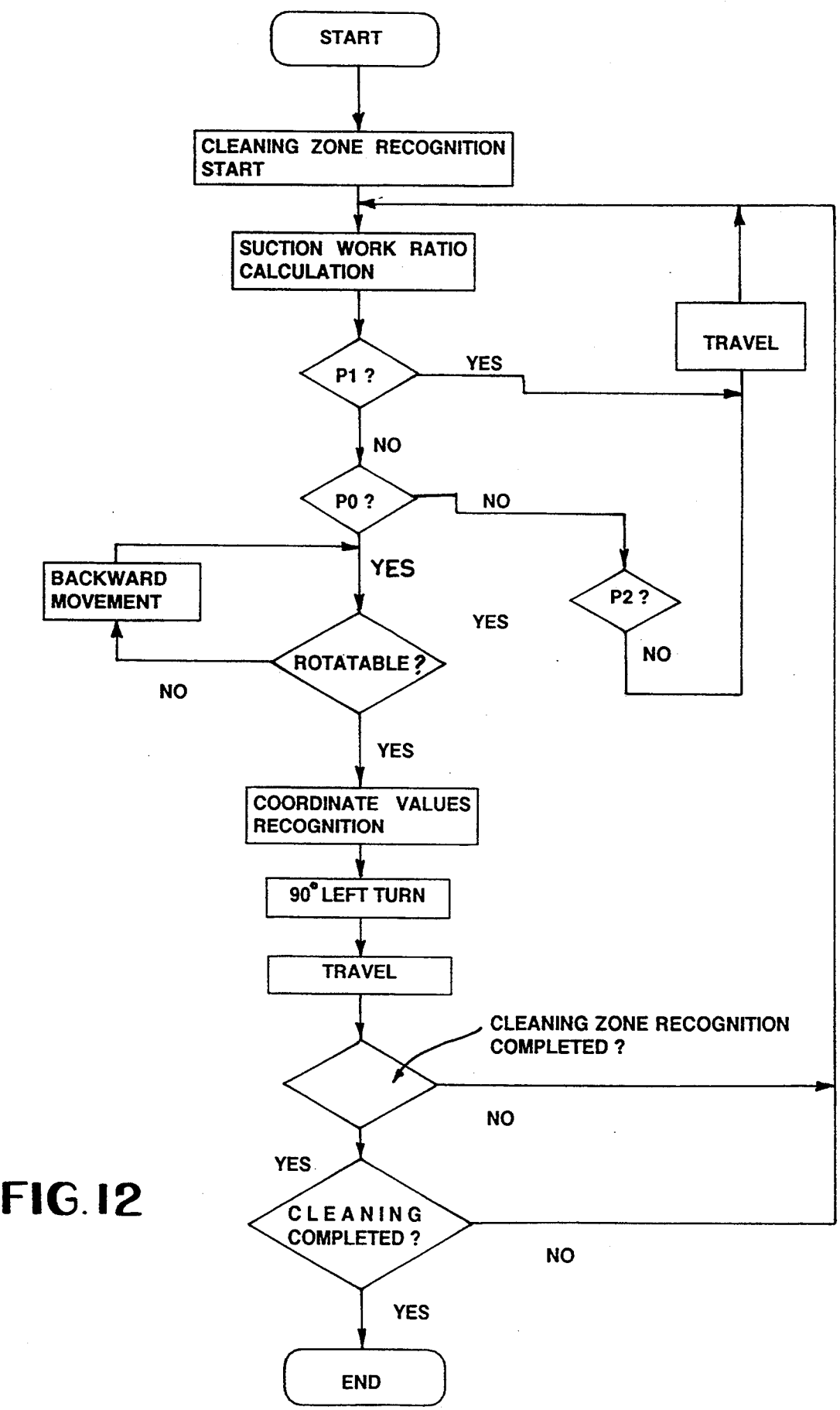
FIG. 12 is a flow chart illustrating a control operation of the apparatus of FIG. 4 in accordance with the present invention.

As shown in FIG. 12, as a cleaning zone recognition is initiated after the cleaner starts to clean a surface 64 to be cleaned, a flow rate of a fluid passing through the extension pipe 66 is measured by use of the ultrasonic wave emitting element T1 and the ultrasonic wave receiving elements T2 and T3 attached to the extension pipe 66 so that the quantity Q of the fluid and the suction work ratio P are calculated. When the calculated suction work ratio is P1 which corresponds to a state that neither of bumping or falling has not been sensed, the cleaner continues to travel. However, when the calculated suction work ratio is P0 which corresponds to a state that a step has been sensed, the turning radius of the cleaner is calculated so as to determine whether the cleaner is turnable. Where the cleaner is unable to turn, the cleaner moves backward slightly. At a turnable position, the cleaner recognizes coordinate values of the position and then turns 90° left.

When the suction work ratio calculated by measuring the fluid flow rate in the extension pipe 66 is P2 which corresponds to a state that a bumping has been sensed, a determination is made about whether the cleaner is turnable. Where the cleaner is unable to turn, the cleaner moves backward slightly. At a turnable position, the cleaner recognizes coordinate values of the position and then turns 90° left. After completing the 90° left turn, the cleaner is continued to travel until the cleaning zone recognition is completed. After the completion of the cleaning zone recognition, the cleaner performs a cleaning in a zig-zag manner for all of predetermined partitioned cleaning zones.

Figure 14:
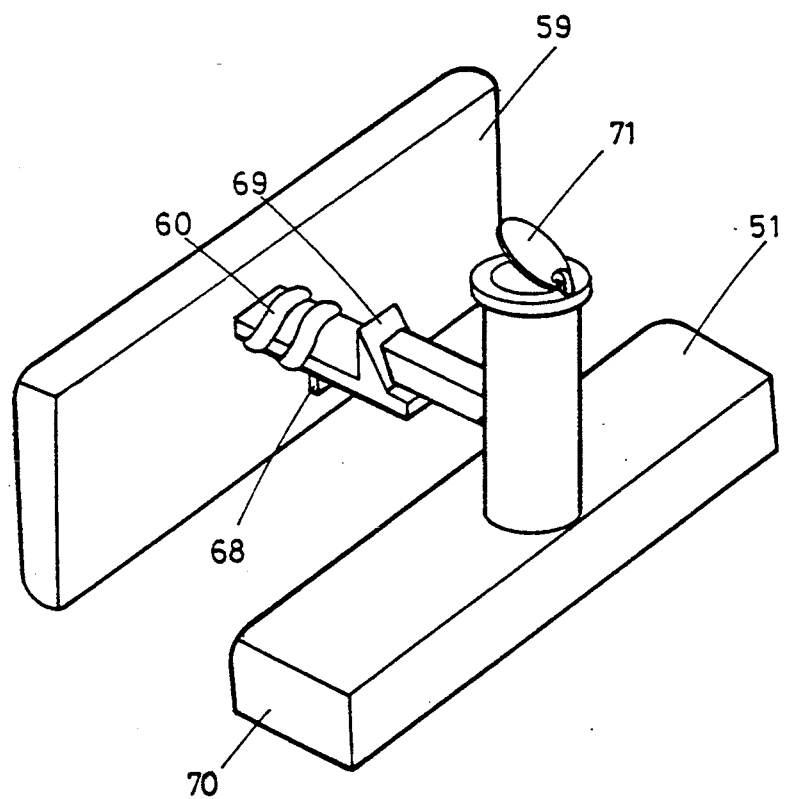
FIG. 14 is a perspective view of an apparatus for preventing bumping and falling of an automatic travelling cleaner in accordance with another embodiment of the present invention.

FIG. 14 is a perspective view of a part of an apparatus for preventing bumping and falling of an automatic travelling cleaner in accordance with another embodiment of the present invention. FIGS. 15A to 15C are sectional views of a cleaner in which the apparatus of FIG. 14 is employed. FIG. 15A shows a condition that the cleaner travels along a normal bottom surface. FIG. 15B shows a condition that the cleaner is bumped against an object. FIG. 15C shows a condition that the cleaner senses a step.

As shown in FIG. 14, the apparatus of this embodiment includes an intake member 51, a packing 65 and a contact protrusion member 59 all having the same construction as those of the embodiment of FIG. 4. The apparatus further includes a body hole 30' formed at the cleaner body 30 and adapted to receive a rod portion of the contact protrusion member 59, and a valve 71 mounted to the upper end of the intake member 51 to be freely opened and closed. The valve 71 is coupled at its one side portion to the intake member 51. In accordance with this embodiment, the contact protrusion member 59 has a cam 69 formed at a rear end of the rod portion. An actuating member 70 is protruded forwardly from the outer surface of the intake member 51 such that its front end is in contact with the cam 69 of the contact protrusion member 59. By this construction, when the cam 69 moves rearwardly, the actuating member 70 slides along the cam 69, thereby causing the intake member 51 to be lifted up. A spring 60 is disposed around the rod portion of the contact protrusion member 59 between the contact protrusion member 59 and a portion of the cleaner body 30 surrounding the body hole 30'.

Operation of the embodiment of FIG. 14 will be apparent from the operation description made in conjunction with FIG. 4.

When the cleaner travels along a normal bottom surface, as shown in FIG. 15A, the intake member 51 maintains a gap δ1 from a surface 64 to be cleaned. In this case, a predetermined load is applied to the cleaning motor 50, thereby causing a torque of the cleaning motor 50 to be increased, as indicated by the value $X_3''$ of FIG. 9A. As a result, the rotation speed of the cleaning motor 50 is decreased, as indicated by the value $X_3$ of FIG. 9A, whereas the current flowing through the cleaning motor 50 is increased in amount, as indicated by the value $X_3'$ of FIG. 9A.

When the cleaner is bumped against an object during its travel, as shown in FIG. 15B, the contact protrusion member 59 is rearwardly pushed against the spring force of the spring 60, thereby causing the cam 69 to move rearwardly. By the rearward movement of the cam 69, the actuating member 70 slides along the cam 69, thereby causing the intake member 51 to be lifted up. As a result, the gap between the intake member 51 and the surface 64 to be cleaned is δ2. At this time, the torque of the cleaning motor 50 becomes the value $X_2''$ of FIG. 9A. The rotation speed of the cleaning motor 50 becomes the value $X_2$ of FIG. 9A, whereas the current flowing through the cleaning motor 50 becomes the value $X_2'$ of FIG. 9A.

On the other hand, when the cleaner senses a step, the gap between the intake member 51 and the surface 64 to be cleaned is increased, as indicated by the value δ3. In this case, the cleaning motor 50 is hardly subjected to a load, thereby causing a torque of the cleaning motor 50 to be decreased, as indicated by the value $X_1''$ of FIG. 9A. As a result, the rotation speed of the cleaning motor 50 is increased, as indicated by the value $X_1$ of FIG. 9A, whereas the current flowing through the cleaning motor 50 is decreased in amount, as indicated by the value $X_1'$ of FIG. 9A.

Thus the cleaner can cope positively with the situation which the cleaner meets with, by sensing the revolutions of the cleaning motor 50 and then sensing the situation from a relation between the revolutions of cleaning motor 50 and the current amount flowing in the cleaning motor 50.

Figure 13:
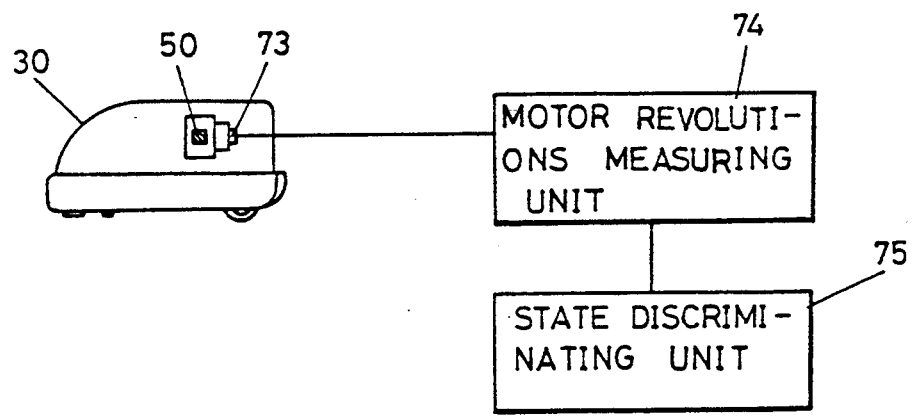
FIG. 13 is a schematic view of an apparatus for preventing bumping and falling of an automatic travelling cleaner in accordance with another embodiment of the present invention.

FIG. 13 is a perspective view of a part of an apparatus for preventing bumping and falling of an automatic travelling cleaner in accordance with another embodiment of the present invention. As shown in FIG. 13, the apparatus includes a revolution detector 73 adapted to output a signal indicative of a number of revolutions of the cleaning motor 50, a motor revolution measuring unit 74 adapted to scan the signal from the revolution detector 73 and thus measure the number of revolutions of the cleaning motor 50, and a state discriminating unit 75 adapted to receive an output signal from the motor revolution measuring unit 74 and thus discriminate the state, i.e., the situation of the cleaner.

Figure 15:
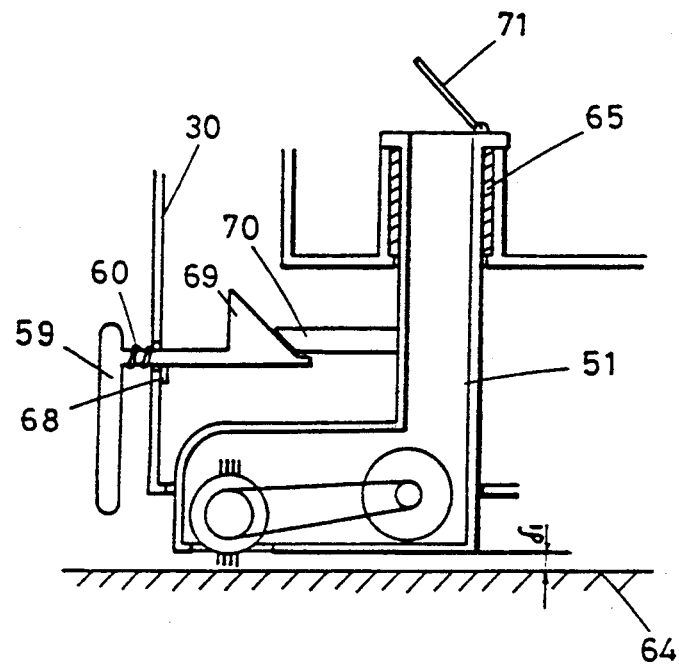
FIGS. 15A and 15C are sectional views of the apparatus shown in FIG. 14, illustrating a normal travel state, a bumped state, and a step-sensed state, respectively.
Figure 15:
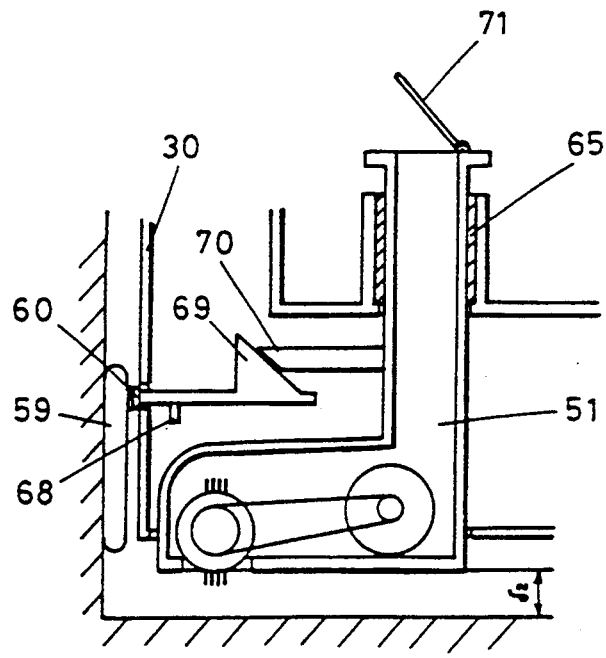
Figure 15C:
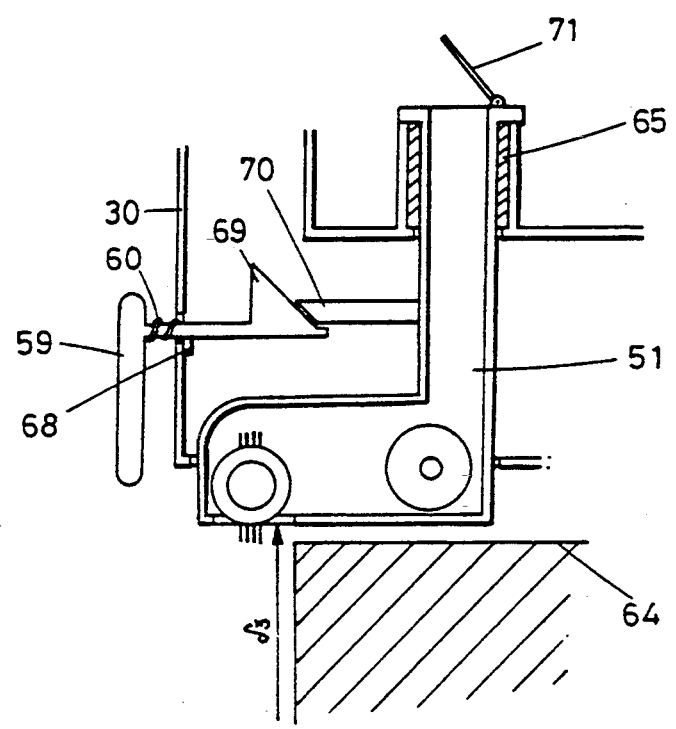
Figure 16:
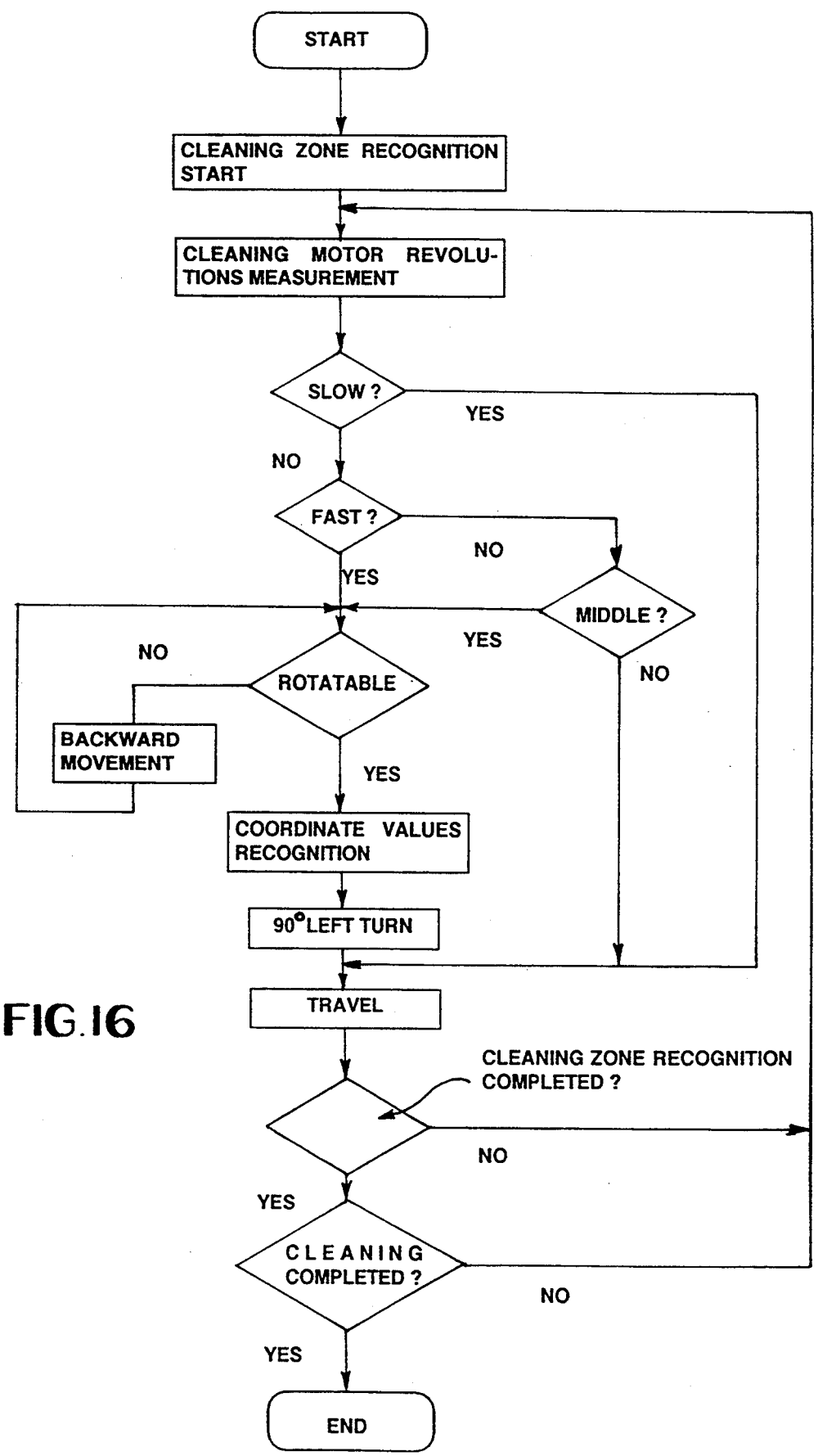
FIG. 16 is a flow chart illustrating a control operation of the apparatus of FIG. 14 in accordance with the present invention.

As shown in FIG. 15, as the cleaner starts to recognize a cleaning zone, it measures the number of revolutions of the cleaning motor 50. When the measured value corresponds to the lower value in the graph of FIG. 9A, the cleaner is regarded as performing a normal travel. In this case, the cleaner continues to travel. However, if the rotation speed of the cleaning motor 50 is high, the cleaner is regarded as having sensed a step. In this case, a determination is made about whether the cleaner is turnable. According to the result of the determination, the cleaner turns 90° left immediately or after moving backward to an area where the cleaner is turnable.

When the rotation speed of cleaning motor 50 has a middle value, the determination about whether the cleaner is turnable is made, as in the case that the step has been sensed. According to the result of the determination, the cleaner turns 90° left immediately or after moving backward to an area where the cleaner is turnable. This state corresponds to a state that a bumping has been sensed. In this case, the spring 60 is maintained at a compressed state, due to the rearward movement of the contact protrusion member 59. Also, the intake member 51 is maintained at a slightly lifted state. As the cleaner moves backward under the above-mentioned condition, the spring 60 urges the contact protrusion member 59 forwardly, thereby causing the intake member 51 to be lowered.

After the 90° left turn, the cleaner recognizes coordinate values of a position where it is positioned. Then, the cleaner travels continuously until the cleaning zone recognition is completed. After the completion of the cleaning zone recognition, the above-mentioned operations are repeated until the cleaning is completed.

In accordance with another embodiment, the bumping and falling of the cleaner can be prevented, by sensing the amount of current flowing in the cleaning motor 50 varied depending on the gap between the intake port 67 of the cleaner and the surface 64 to be cleaned, by use of a current measuring device such as a sensor, and thus determining a travelling state, a bumped state and a step-sensed state of the cleaner, in place of sensing the rotation speed of the cleaning motor 50.

In accordance with another embodiment, the bumping of the cleaner can be sensed from a variation in a torque applied to each travel motor of the cleaner. In this case, a bumping sensing apparatus is provided, which comprises an encoder sensor adapted to detect rotation speeds of travel motors 13 and 14, a plurality of distance sensors arranged around the cleaner and adapted to sense the distance between the cleaner and an object, a control circuit adapted to decode sensed distance information from the distance sensor and thus control the rotations of the motors, an input/output circuit adapted to perform inputting and outputting of data, a control operating circuit adapted to perform operation of input and output data and control of travel and drive commands, a microcomputer having a memory storing data and programs, an encoder circuit adapted to supply information about rotation speeds of left and right travel motors detected by the encoder sensor, in the form of digital information, to the microcomputer, a travel motor driving unit adapted to control the left and right travel motors under a control of the microcomputer, and a distance sensor circuit adapted to supply information about the distance sensed by the distance sensor, in the form of digital information, to the microcomputer.

In this case, the travel motor driving unit comprises a D/A converter for converting digital control information from the microcomputer into an analog signal, a subtractor for outputting error information about a drive current amount, a controller for receiving the error information and thus controlling the drive current amount to minimize it, a drive circuit for driving the travel motors according to an output signal from the controller, a current measuring circuit such as a hall sensor for measuring a current flowing in each travel motor and feeding the measured current value back to the subcontractor, and an A/D converter for converting the measured current value from the current measuring circuit into a digital signal and supplying the digital signal to the microcomputer as information for determining the torque applied to each travel motor.

The microcomputer calculates the loaded torque from the current value flowing in each travel motor and the rotation speed value of the travel motor, compares the result obtained by the calculation with a reference value indicative of the bumped state of the cleaner, and performs procedures associated with the determination of the bumped state, according to the comparison result.

Figure 17:
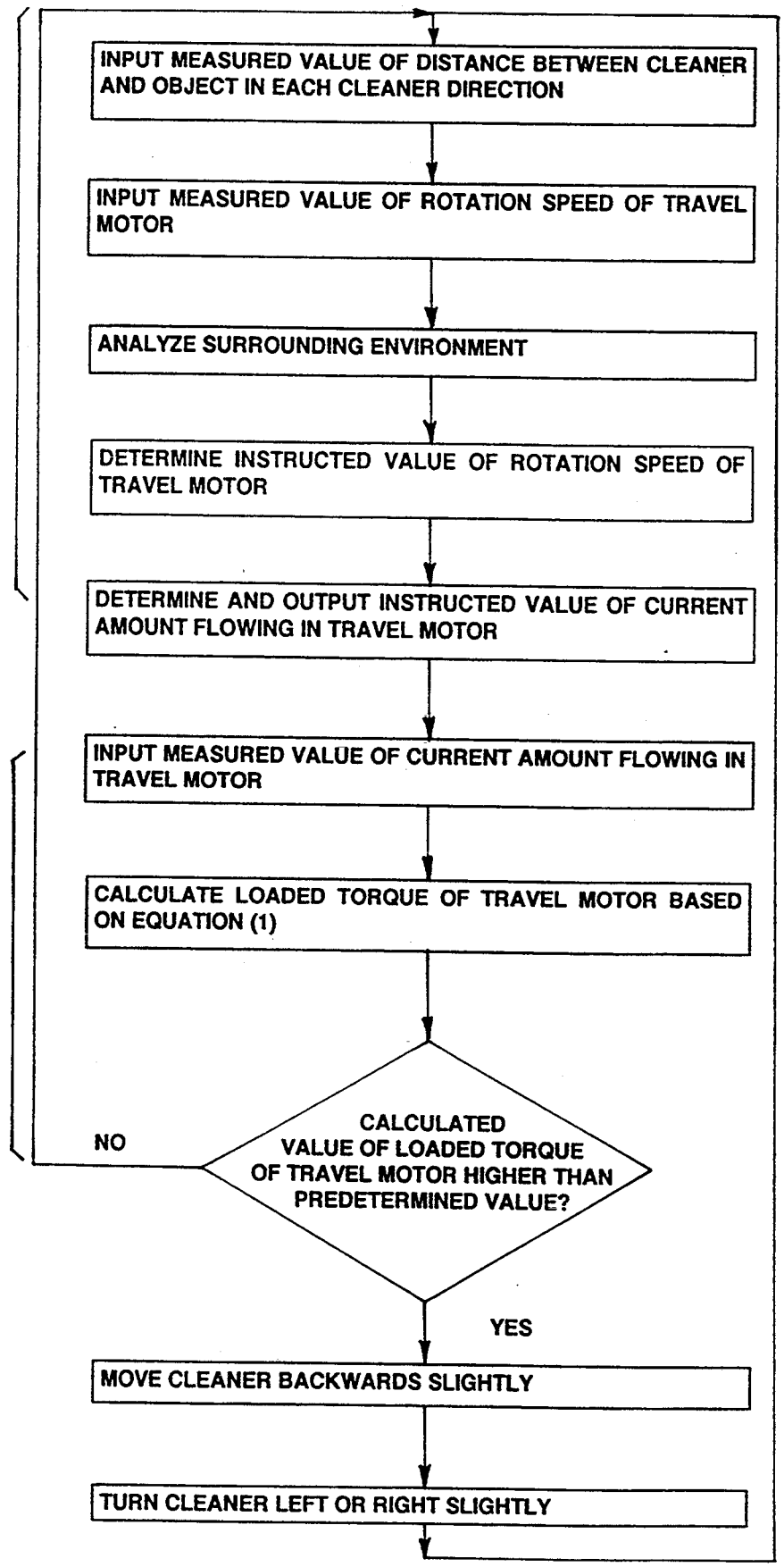
FIG. 17 is a flow chart illustrating a control operation of an apparatus for preventing bumping and falling of an automatic travelling cleaner in accordance with another embodiment of the present invention.

Operation of this embodiment will now be described, in conjunction with FIG. 17.

The microcomputer senses a distance from the cleaner to an object disposed in each direction, through the distance sensor, reads the sensed distance value via the distance sensor circuit, and reads a value indicative of the rotation speed of each travel motor via the encoder circuit.

Then, the microcomputer analyzes the environment surrounding the cleaner from the measured distance, determines an instructed value of an appreciated rotation speed of each travel motor, and outputs an instructed value of a drive current corresponding to the instructed value of rotation speed through the travel motor driving unit. Accordingly, the drive motors are driven so that a cleaning is carried out during a travel of the cleaner.

During the cleaning, a measured value of a current amount flowing in each travel motor is read through the A/D converter.

Thereafter, the microcomputer calculates a loaded torque of each travel motor by using the measured value of the current amount flowing in the travel motor and the measured value of the rotation speed of the travel motor read through the encoder sensor and the encoder circuit.

The calculation of the loaded torque may be carried out by use of a well-known travel control program. Assuming that the current cycle of procedures periodically repeated in the travel control program is K, a loaded torque $T_L(K)$ of each travel motor can be calculated from the following equation (3):

$$T_L(K) = Ka^* ia(K) - Bm^* Wm(K) - Jm^*[Wm(K) - Wm(K-1)] \quad (3)$$

wherein, Ka represents a torque constant of the travel motor, ia(K) a measured value of the current amount flowing in the motor at the current cycle, Bm a viscous friction coefficient of the motor, Wm(K) a measured value of the rotation speed of the motor at the current cycle, Wm(K−1) a measured value of the rotation speed of the motor at the previous cycle, and Jm a rotational inertia coefficient of the motor.

When the cleaner is bumped against an object, each travel motor is subjected to an excessive torque. In this regard, the state that the calculated torque $T_L(K)$ is not lower than a reference torque indicative of a bumping is determined as a bumped state. On the other hand, the state that the calculated torque $T_L(K)$ is lower than the reference torque is determined as a state that no bumping has occurred.

That is, when the cleaner is bumped against an object, an excessive torque is applied to at least one of the travel motors which are left and right wheel driving motors. At this time, the calculated torque $T_L(K)$ is considerably higher than the loaded torque ($=0$) at a normal travel state, i.e., the state that no bumping occurs.

Accordingly, when the calculated torques $T_L(K)$ of both the travel motors are lower than the reference torque, the cleaning procedure is continued. When the calculated torque $T_L(K)$ of at least one of the travel motors is not lower than the reference torque, the travel motors are controlled so that the cleaner moves backward slightly and then turns left or right to bypass the object.

On the other hand, the same effect as mentioned above may be obtained by calculating a loaded torque $T_L(K)$ from an instructed value of a drive current amount to be supplied to each travel motor. The loaded torque $T_L(K)$ is calculated by the instructed value of the drive current amount for ia(K) of the equation (3), in the microprocessor.

Where the travel motors are controlled, based on an applied voltage, in place of the current amount, the same effect can be also obtained by calculating a loaded torque $T_L(K)$ from an instructed value of a drive voltage to be applied to each travel motor or a measured value of a voltage applied to the motor. The loaded torque $T_L(K)$ is calculated by the instructed voltage value or the measured voltage value for ia(K) of the equation (3), in the microprocessor.

The same effect can be obtained in a case where the travel motors are controlled in a pulse width modulation (PWM) manner. In accordance with the PWM control, the travel motors are controlled, based on a rate of a voltage applied to the travel motors, i.e., a PWM value. In this case, the loaded torque $T_L(K)$ is calculated by the PWM value for ia(K) of the equation (3).

As apparent from the above description, the present invention eliminates the provision of a plurality of sensors densely arranged around a cleaner and adapted to sense bumping and falling of the cleaner and thus eliminates the requirement of additional devices for the sensors. This reduces the manufacture costs.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for preventing bumping and falling of an automatic travelling cleaner, comprising:
    a cleaner body including an interior portion and an exterior portion;
    a dust collecting chamber formed in the interior of said cleaner body;
    an extension pipe connected to said dust collecting chamber;
    an intake member slidably fitted in said extension pipe;
    a packing fitted in one end of said extension pipe and adapted to prevent a fluid from leaking through the one end of said extension pipe;
    an ultrasonic wave emitting element disposed between said extension pipe and the dust collecting chamber and adapted to emit an ultrasonic wave indicating a flow rate of a fluid being sucked through said extension pipe;
    a pair of ultrasonic wave receiving elements disposed between said extension pipe and said dust collecting chamber and adapted to receive the ultrasonic wave from said ultrasonic wave emitting element and output a signal representative thereof;
    fluid flow rate sensing/suction work ratio calculating means, adapted to receive the signal output from said ultrasonic wave receiving elements, for sensing a variation in the flow rate of said fluid being sucked, and calculating a suction work ratio, based on said received ultrasonic waves;
    a bumper provided on the exterior portion of said body member;
    a bumper hole provided at a predetermined position within said cleaner body;
    a contact protrusion member extending through the bumper hole, said contact protrusion member being adapted to support said intake member and disposed to reciprocate forward and backward; and
    a spring adapted to resiliently connect said contact protrusion member with said bumper.

2. The apparatus in accordance with claim 1, wherein said intake member includes:
    a rotating brush and a brush driving motor connected with each other via a timing belt and disposed in an interior of the intake member;
    an intake port disposed adjacent to a lower end of said rotating brush;
    an inclined surface provided at a front lower end portion of the intake member and adapted to easily lift said cleaner when said bumper is bumped against a protrusion; and
    a bracket attached to a predetermined position on an outer surface of the intake member and provided with a roller.

3. The apparatus in accordance with claim 1, wherein said contact protrusion member includes:
    a sector protrusion adapted to be in selective contact with said intake member;
    a spring member supported between an inner wall of said cleaner body and an extension arm extending from said sector protrusion; and
    a contact portion protruding outwardly of said cleaner body and adapted to be able to come into contact with an object.

4. The apparatus in accordance with claim 1, wherein said fluid flow rate sensing/suction work ratio calculating means comprises:
    a fluid flow rate sensing circuit for receiving ultrasonic waves from said ultrasonic wave receiving elements and sensing a flow rate of the fluid being sucked, based on said receive ultrasonic waves; and
    a suction work ratio calculating circuit for receiving an output signal from said fluid flow rate sensing circuit and calculating a fluid quantity from a fluid quantity equation including factors of Cross-sectional Area, Fluid Flow Rate and a suction work ratio from a suction work ratio equation of a Constant, Fluid Quantity, and Vacuum Level.

5. The apparatus in accordance with claim 1, wherein said intake member includes an actuating member provided at a predetermined position of the intake member and operatively connected with said contact protrusion member so that the intake member moves upward and downward, according to backward and forward movements of said contact protrusion member.

6. The apparatus in accordance with claim 5, wherein said intake member includes a valve mounted to an upper end of the intake member to be freely opened and closed, said valve being coupled at one side portion thereof to the intake member.

7. The apparatus in accordance with claim 5, wherein said contact protrusion member has a cam adapted to be in contact with said actuating member so that the actuating member slides freely along said cam.

8. The apparatus in accordance with claim 1, wherein said ultrasonic wave emitting element and said ultrasonic wave receiving elements are attached to an inner surface of said extension pipe such that the ultrasonic wave emitting element is opposite to the ultrasonic wave receiving elements.

* * * * *